J. R. GAMMETER.
ENDLESS BELT AND METHOD OF MAKING THE SAME.
APPLICATION FILED NOV. 5, 1913.
1,277,711.
Patented Sept. 3, 1918.
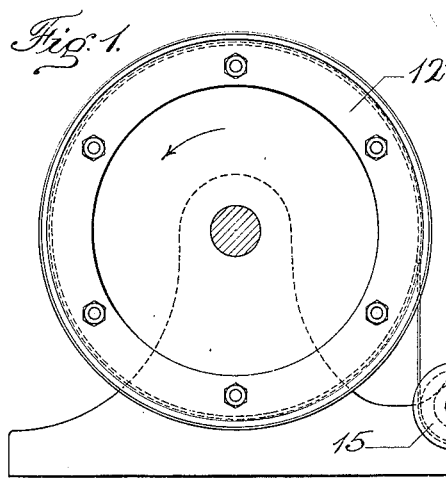
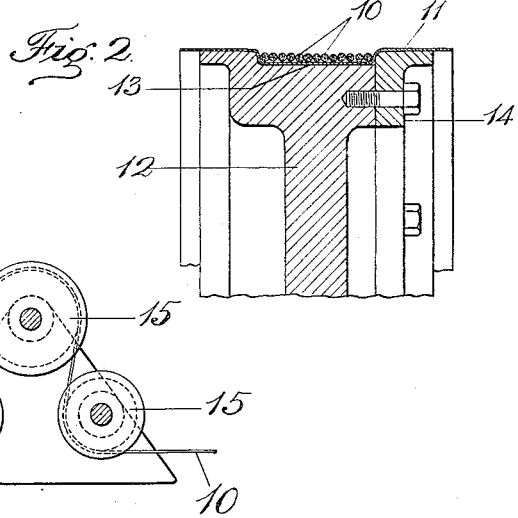
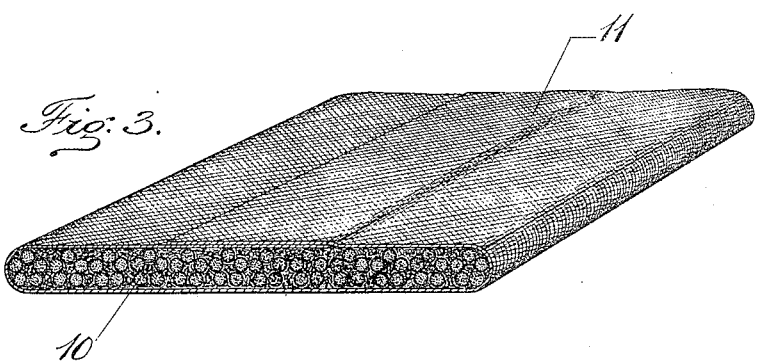
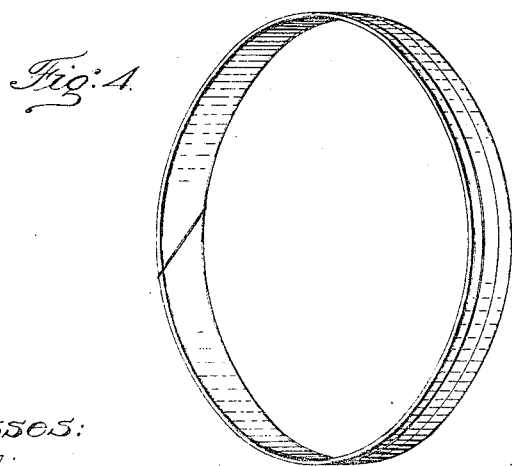

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

ENDLESS BELT AND METHOD OF MAKING THE SAME.

1,277,711.     Specification of Letters Patent.     Patented Sept. 3, 1918.

Application filed November 5, 1913. Serial No. 799,311.

*To all whom it may concern:*

Be it known that I, JOHN R. GAMMETER, a citizen of the United States, residing at Akron, in the county of Summit and State of Ohio, have invented certain new and useful Improvements in Endless Belts and Methods of Making the Same, of which the following is a specification.

The object of this invention is to produce a practically non-stretchable, flat, endless belt of maximum tensile strength and flexibility.

Of the accompanying drawings,

Figure 1 is a side elevation illustrating the mode of winding the body-cord on a circular form or drum.

Fig. 2 is a section showing the position of the cover-strip and the body-strands in the groove of the forming drum.

Fig. 3 is a sectional perspective view of a portion of the completed belt.

Fig. 4 is a perspective view of the belt.

The body of my improved belt consists of a series of strands 10 of rubberized fibrous cord or cords laid closely together, side by side, preferably in a single row only, and a cover 11 which I prefer to make of rubberized fibrous fabric cut on the bias, so that the warp and weft threads cross the belt diagonally, the whole being vulcanized together. It is important to have the stretch taken out of the belt during its process of manufacture. Heretofore in making belts of fabric or cord and rubber, the belt has been first completely formed and then stretched as a whole, either in sections or in its complete length, before being vulcanized, but the stretching in that case requires a great deal of power, and unduly strains the fabric cover and sometimes the body of the belt at the splice or splices. My present process enables me to wind the body-cord one turn at a time and take the stretch out of each strand separately with a comparatively small exertion of power.

The method of operation is illustrated in Figs. 1 and 2. 12 is a circular form or drum having a shallow peripheral groove 13, one side of which is formed by a detachable ring 14 which permits the removal of the finished belt. In making a belt, the cover-strip 11 of rubberized bias fabric is laid over the periphery of the drum and in the groove thereof as represented in Fig. 2, and one end of the cord 10, which is preferably made of twisted threads cabled as shown in Fig. 3, may be splayed or unraveled and attached to the inner surface of the cover at one side of the groove, adhesion being produced by the uncured rubber of the surfaces of the cord and cover. The drum is mounted on an arbor and rotated by suitable means, and the operator applies a strong tension to the cord as it winds on the drum. As an aid in furnishing the tension, I have represented a series of guide-rolls 15 producing several sharp turns in the cord before it passes onto the drum 12. The successive strands of cord are wound in close contact, side by side, and after a single row has been completed and the end severed, the margins of the fabric strip forming the outside of the cover are closed over the row of cord-strands and overlapped, and I then vulcanize the belt while it is still on the drum 12, the latter being preferably first wrapped with a temporary fabric strip after the ordinary practice followed in the steam-curing of flat bands on a drum. The finished belt may finally be removed on detaching the side flange 14. For long belts, the character of the shaping and vulcanizing form may differ from the single drum 12, and the steps of the process may be varied to suit the conditions. The vulcanized rubber binds the entire structure together and aids in keeping the cord-strands in their stretched condition. If desired, additional rubber strips may be inserted above and below the body-cords during the process of manufacture, or the rubber could be applied in solution after the cord-body is wound in place, but I prefer to provide the surface of the cord and fabric cover with sufficient rubber to form a bond before they are assembled in the belt. It is to be understood however, that the term "rubberized" cord or fabric is intended to cover various methods of incorporating the rubber.

A single row of cords gives the belt greater flexibility than plural rows or bundled parallel strands, and a cover of bias fabric is more flexible than one of straight fabric, and more easily applied without wrinkling.

I claim:

1. The method of making a flat, endless belt which consists in winding a rubberized fibrous cord under strong tension in a series of adjacent convolutions on a support, and then vulcanizing the article while still under such tension on said support.

2. The method of making a flat, endless belt which consists in laying a rubberized fabric cover-strip on the periphery of a forming support, winding a rubberized cord thereon under strong tension in a series of adjacent convolutions, closing the cover-strip over the outer side of the body of cord-strands, and vulcanizing the article, while still under tension, in place on the support.

3. An endless flat belt comprising a body of stretched rubberized cord strands, and an unstretched rubberized fabric cover, vulcanized together.

4. An endless flat belt comprising a body of stretched rubberized cord strands continuous with each other, and an unstretched cover of rubberized bias woven fabric, vulcanized together.

5. An endless belt comprising a flat helix of stretched cord, vulcanized rubber holding said cord in its stretched condition, and additional means for binding the cord strands together.

In testimony whereof I have hereunto set my hand in the presence of two subscribing witnesses, this twenty-second day of October, 1913.

JOHN R. GAMMETER.

Witnesses:
WALTER K. MEANS,
ILLA N. KIRN.